ent the collapse of the side members of the hollow structure together with

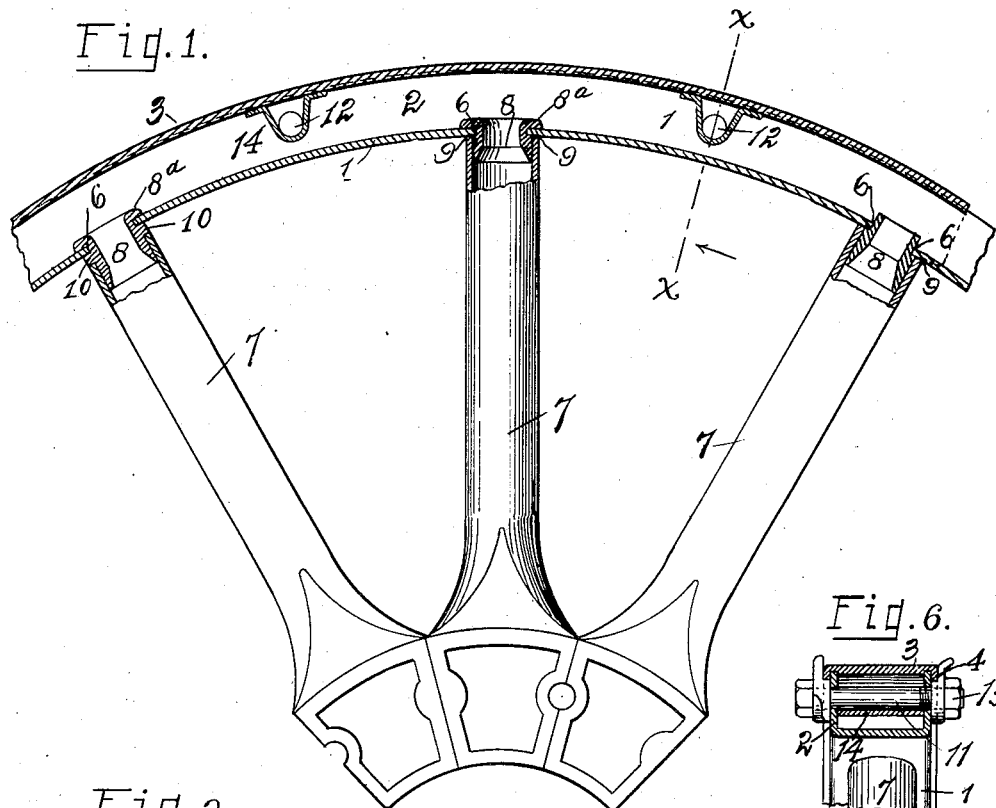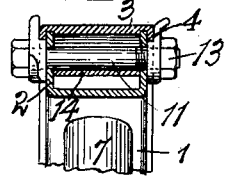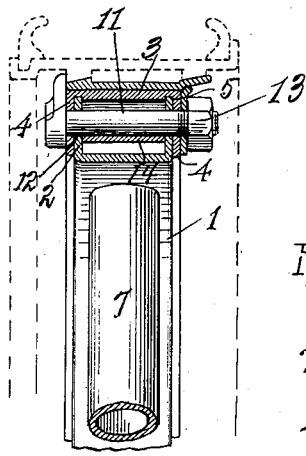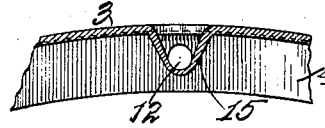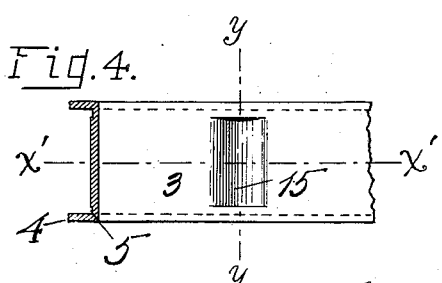

UNITED STATES PATENT OFFICE.

GUSTAV STRUB, OF TOLEDO, OHIO, ASSIGNOR OF ONE-FOURTH TO GEORGE ALVIN HATTERSLEY, OF NORWOOD, OHIO, ONE-FOURTH TO WILL CHESTER HATTERSLEY, OF CINCINNATI, OHIO, ONE-FOURTH TO DAVID EMERY HUNT, OF TOLEDO, OHIO, AND ONE-FOURTH TO ELIJAH BEANS CORNELL, OF PHILADELPHIA, PENNSYLVANIA.

FELLY FOR METAL WHEELS.

1,202,118.     Specification of Letters Patent.     Patented Oct. 24, 1916.

Application filed April 27, 1914. Serial No. 834,597.

*To all whom it may concern:*

Be it known that I, GUSTAV STRUB, a citizen of the United States, residing at Toledo, in the county of Lucas and State of Ohio, have invented certain new and useful Improvements in Fellies for Metal Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a metal automobile wheel adapted for the reception of a pneumatic tire, and, more particularly, to the outer portion or rim of the wheel, the remainder of the wheel or hub-portion being made the subject of a separate application for patent filed contemporaneously herewith.

More specifically, this invention relates to the construction of a hollow metal felly; also to means for preventing the collapse of the felly under the pressure of the bolts which secure the tire retaining members in place, and to means for permanently and rigidly connecting the outer ends of the wheel-spokes with the inner member of the felly.

My invention consists of the construction and arrangement of parts hereinafter described, and illustrated in the accompanying drawings, in which—

Figure 1 is a side-elevation of a segment of my wheel, the rim and the spoke-ends being shown in central vertical section; Fig. 2, a cross-sectional elevation of my wheel-rim taken on line x—x Fig. 1, the dotted lines illustrating means for holding a pneumatic tire in place upon my felly; Fig. 3, a sectional side-elevation of a portion of my felly taken on line x'—x' Fig. 4, showing an alternative means for preventing the collapse of its side members; Fig. 4, a plan-view of the same; Fig. 5, a sectional end-view of the same taken on line y—y Fig. 4, and Fig. 6, a transverse sectional elevation of my felly showing still another method of preventing the collapse of the side members of the hollow structure together with devices for detachably retaining a pneumatic tire.

Like numerals of reference indicate like parts throughout the drawings.

In the drawings, 1 is a strip of metal, preferably of steel, of angular U-shape in cross-section, the ends of the strip being united so that it forms a circle deeply channeled on its outer side. This piece forms the inner and side members 2 of a felly. The outer member of the felly, or the felly-band, 3, fits tightly around and upon the outwardly projecting edges of the side members 2 and is provided with flanges 4 which project radially inwardly and which overlap the outer sides of the side members 2. The inner side of the felly-band next to the flanges 4 is provided with shallow grooves 5 into which the edges of the side members 2 snugly fit, as shown in Figs. 2 and 6. It will be seen that the structure thus far described forms a hollow circular body, substantially rectangular in transverse section.

At equi-distant intervals around the inner side of the felly are elongated or angular holes 6 for the reception of the spoke-ends. The spokes 7 are tubular and have in their outer ends an inner reinforcing sleeve 8 brazed or otherwise permanently secured in place. Each of the spokes is provided with a shoulder, which projects against the outer margin of its hole 6. This shoulder may be formed by the end of the tubular spoke,—as at 9 on the central spoke, Fig. 1,—or may be formed by an annular flange 10 on the sleeve 8 overlapping the end of the tubular spoke and abutting against the outer margin of the hole 6, as shown on the spoke to the left in Fig. 1. The sleeves 8 project beyond the ends of the spokes 7 and pass through and snugly fit the holes 6. The projecting ends of the sleeves 8 are peened to form flanges 8ª so that the margins of the holes 6 are tightly clamped between the shoulders 9 and these flanges. The felly and the spoke-ends are now permanently and immovably joined. It will be understood that the assembling of the spokes and the part 1 is first effected and that the strip forming the felly-band is then placed around the periphery of the side members 2 of the felly, the meeting ends of the fellyband being now welded together.

The felly thus far described takes the place of the usual wood felly of an automobile wheel, and is now ready for the reception of the ordinary metal tire which is to receive the pneumatic tire, as well as the devices designed to retain and to facilitate the placing and removal of the pneumatic tire, which devices are indicated in Figs. 2 and 6 but which, forming no part of this invention, need not be here further described.

It is necessary that the devices for detachably holding the pneumatic tire be mounted upon and secured to the felly, and, to this end, that threaded bolts pass through the felly and that these bolts carry nuts by which such tire retaining devices may be clamped and held in operative position. It is necessary that means be provided for preventing the great lateral pressure of these bolts and nuts upon the side members of the felly from crushing them inwardly. I have suggested in the drawings various methods for preventing such mishap, as, for instance, in Fig. 2 the double overlapping side flanges of the felly taken with the grooves 5 engaged by the margins of the side members 2, would, with certain proportions and weight of parts, prevent the collapse of the sidewalls when the bolts 11 which pass through holes 12 are tightened up by nuts 13. In Figs. 1, 2 and 6 there is illustrated another or additional means for preventing the collapse of the hollow felly, consisting of pieces of metal 14 bent into U-shape form in crosssection and having their flanged margins spot-welded to the inner side of the fellyband with the open ends of this trough-like member in register with the holes 12. Again, portions 15 may be struck inwardly from the felly-band to make trough-like portions integral with the felly-band and which form cross-braces and guides for the bolts 11 as shown in Figs. 3, 4 and 5. Either form of guide and cross-brace 14—15 will, by their end-resistance, prevent the transverse collapse of the felly under the stress of the bolts and nuts 11—13.

Having described my invention, what I claim and desire to secure by Letters Patent, is—

1. In a device of the described character, a channeled metal felly comprising integral inner and side members meeting in substantially right angles and embraced by a fellyband, threaded transverse bolts engaged with said side members, and means between and abutting the side members for preventing the collapse of said side members under the stress of said bolts.

2. In a device of the described character, a channeled metal felly consisting of integral inner and side members and a separate felly-band which peripherally embraces said side members, said side members having horizontally therethrough corresponding opposed bolt-holes, bolts in said holes, nuts on said bolts, and transverse braces extending from the felly-band and abutting said side members which prevent the inward yielding of said side members.

3. In a device of the described character, a channeled metal felly, a felly-band which peripherally embraces the side members of the felly, said side members being provided with corresponding opposed bolt-holes, bolts in said holes, guides for said bolts between said opposed holes, said guides consisting of transverse channels struck inwardly from and integral with said felly-band and forming braces which prevent the inward deflection of the side members of the felly under the stress of the bolt.

4. A device of the described character comprising a felly consisting of integral inner and side members and a separate fellyband which embraces said side members, said side members having corresponding opposed bolt-holes, said inner member having a series of radial spoke-holes, bolts in said bolt-holes, transverse braces which embrace and guide said bolts and which prevent the collapse of the side members of the felly, and means for connecting with said felly the outer ends of a series of spokes.

5. A metal felly consisting of an integral metal member bent into angular U-shape in cross-section, the sides of the channeled member thus formed having opposed equidistant bolt-holes, the inner peripheral member being bored at equi-distant intervals for the reception of spoke-ends; a fellyband which embraces the side-members of said felly and which has internal peripheral channels for the reception of the edges of said side-members; bolts extending through said opposed bolt-holes, and means for preventing the collapse of the side-members under the stress of said bolts.

In testimony whereof I affix my signature in presence of two witnesses.

GUSTAV STRUB.

Witnesses:
 Geo. B. Orwig,
 Gertrude Bracker.